(12) United States Patent
Gideon

(10) Patent No.: US 11,070,166 B2
(45) Date of Patent: Jul. 20, 2021

(54) ADJUSTABLE MOUNTING DEVICE

(71) Applicant: Energy Consultants Group, LLC, Anamosa, IA (US)

(72) Inventor: Jason C. Gideon, Anamosa, IA (US)

(73) Assignee: ENERGY CONSULTANTS GROUP, LLC, Anamosa, IA (US)

( * ) Notice: Subject to any disclaimer, the term of this patent is extended or adjusted under 35 U.S.C. 154(b) by 14 days.

(21) Appl. No.: 16/213,433

(22) Filed: Dec. 7, 2018

(65) Prior Publication Data

US 2019/0326849 A1    Oct. 24, 2019

Related U.S. Application Data

(60) Provisional application No. 62/659,765, filed on Apr. 19, 2018.

(51) Int. Cl.
*F16M 13/02* (2006.01)
*H02S 20/30* (2014.01)
*H02S 20/23* (2014.01)

(52) U.S. Cl.
CPC ............ *H02S 20/30* (2014.12); *F16M 13/02* (2013.01); *H02S 20/23* (2014.12); *F16M 2200/028* (2013.01)

(58) Field of Classification Search
USPC .......... 248/214, 226.11, 227.4, 227.2, 228.1; 126/623
See application file for complete search history.

(56) References Cited

U.S. PATENT DOCUMENTS

| 7,435,897 | B2 |  | 10/2008 | Russell |  |
|---|---|---|---|---|---|
| 7,987,641 | B2 | * | 8/2011 | Cinnamon | H02S 20/23 52/173.3 |
| 8,122,648 | B1 | * | 2/2012 | Liu | F24S 25/61 52/58 |
| 8,387,319 | B1 | * | 3/2013 | Gilles-Gagnon | F24S 25/615 52/173.3 |

(Continued)

FOREIGN PATENT DOCUMENTS

| CN | 103081119 |  | 5/2013 |  |  |
|---|---|---|---|---|---|
| DE | 4106743 | A1 | * | 9/1992 | E04H 12/2261 |

(Continued)

OTHER PUBLICATIONS

Martin, "How to install a solar panel mounting system on your roof", Federal Government Solar Incentives, www.solarchoice.net.au/blog/how-to-install-a-solar-panel-mounting-system-on-your-roof, Apr. 12, 2011, 8 pages.

(Continued)

*Primary Examiner* — Alfred J Wujciak
(74) *Attorney, Agent, or Firm* — Duane Morris LLP; Gregory M. Lefkowitz

(57) ABSTRACT

An adjustable mounting device is described. The device can include a baseplate having a plurality of holes, a bracket having a horizontal element, vertical element, and plurality of holes, and a headed rod having a head portion coupled to the baseplate and a rod portion. The headed rod can be configured to provide an adjustable spaced distance between the baseplate and bracket. A system including a plurality of adjustable mounting devices is also described.

17 Claims, 9 Drawing Sheets

(56) References Cited

U.S. PATENT DOCUMENTS

| | | | | |
|---|---|---|---|---|
| 8,695,290 B1* | 4/2014 | Kim | ............ | F24S 25/67 |
| | | | | 52/173.3 |
| 8,752,338 B2 | 6/2014 | Schaefer et al. | | |
| 8,839,575 B1* | 9/2014 | Liu | ............ | H02S 20/23 |
| | | | | 52/173.3 |
| 9,954,479 B1* | 4/2018 | Atia | ............ | H02S 20/24 |
| 9,985,579 B2* | 5/2018 | Warin | ............ | H02S 20/20 |
| 10,097,133 B2* | 10/2018 | Aliabadi | ............ | H02S 20/23 |
| 10,277,162 B1* | 4/2019 | Atia | ............ | H02S 20/23 |
| 10,541,641 B2* | 1/2020 | Tomolillo | ............ | F24S 25/40 |
| 2006/0180556 A1* | 8/2006 | Shih | ............ | H05K 7/1489 |
| | | | | 211/26 |
| 2006/0276558 A1* | 12/2006 | Petela | ............ | C08J 9/0061 |
| | | | | 521/56 |
| 2009/0025314 A1 | 1/2009 | Komamine et al. | | |
| 2009/0194098 A1 | 8/2009 | Placer | | |
| 2011/0233157 A1 | 11/2011 | Kmita | | |
| 2012/0187267 A1 | 7/2012 | Hudson et al. | | |
| 2014/0202525 A1 | 7/2014 | Janssens et al. | | |
| 2016/0043687 A1 | 2/2016 | McPheeters et al. | | |
| 2017/0237387 A1 | 8/2017 | Hudson et al. | | |

FOREIGN PATENT DOCUMENTS

| | | |
|---|---|---|
| DE | 102005018687 | 11/2006 |
| EP | 2592365 | 5/2013 |
| GB | 2499324 | 8/2013 |
| JP | 5694036 B2 * | 4/2015 |

OTHER PUBLICATIONS

Product Information, "L Metal Bracket/Holder/Mount for Canon Speelite Flash 600EX-RT/550EX/540EZ/580EX", www.photoloving.com, Jul. 15, 2013, 6 pages.

Product Information, "Universal Black Double Dual L-Shaped Bracket Holder/Mount for Flash Speedlite & Digital SLR Cameras Tripod Two Piece Set", www.dhgate.com/store/product/yaomeng-universal-black-double-dual-l-shaped/397861076.html, Shenzen Vivo Technology Col., Ltd., 2015, 8 pages.

Product Information, "L-Shaped Mounting Bracket", www.parallax.com/product/720-00011, Parallax Inc., Sep. 2013, 3 pages.

* cited by examiner

ADJUSTABLE MOUNTING DEVICE

CROSS-REFERENCE TO RELATED APPLICATIONS

The present application claims benefit of U.S. Provisional Patent Application No. 62/659,765, filed Apr. 19, 2018, the entirety of which is incorporated herein by reference.

FIELD OF THE INVENTION

The disclosed subject matter relates generally to an adjustable mounting device and system comprising the same.

BACKGROUND

Mountable objects such as solar panels are often mounted to the roof of a structure using a plurality of brackets that are secured to trusses under the roof deck.

SUMMARY

In various embodiments, an adjustable mounting device is disclosed. The device can comprise a baseplate comprising a plurality of holes; a bracket having a horizontal element, vertical element, and a plurality of holes; and a headed rod having a head portion coupled to the baseplate and a rod portion. The headed rod can be configured to provide an adjustable spaced distance between the baseplate and bracket.

In various embodiments, a system is disclosed. The system can comprise a plurality of adjustable mounting devices.

BRIEF DESCRIPTION OF THE DRAWINGS

The features and advantages of the adjustable mounting bracket will be more fully disclosed in, or rendered obvious by the following detailed description of the preferred embodiments, which are to be considered together with the accompanying drawings wherein like numbers refer to like parts and further wherein:

FIG. 5A is a sectional view along the 5-5 line in FIG. 4A, in accordance with some embodiments described herein, while

DETAILED DESCRIPTION

Figure 1:
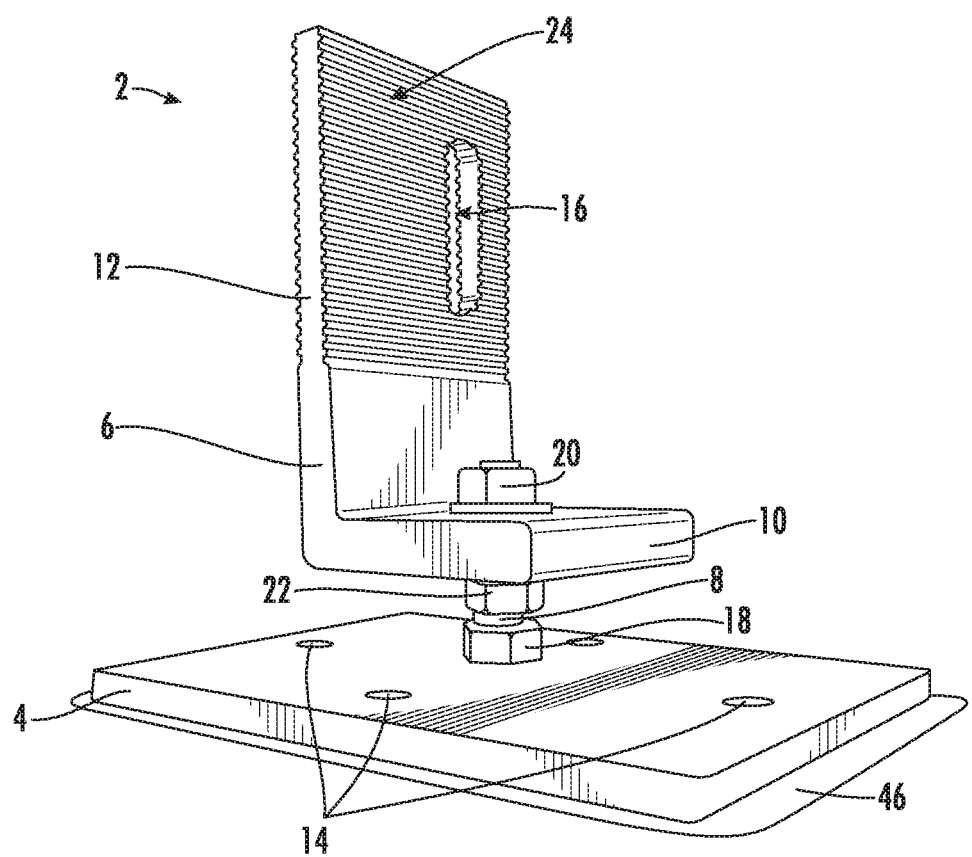
FIG. 1 is a perspective view of an adjustable mounting device, in accordance with some embodiments described herein.

This description of sample embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the product be constructed or operated in a particular orientation. Terms concerning attachments, coupling and the like, such as "connected," refer to a relationship wherein structures are secured or attached to one another either directly or indirectly through intervening structures, as well as both movable or rigid attachments or relationships, unless expressly described otherwise.

As show in FIGS. 1-8B, an adjustable mounting device (2) is provided. The adjustable mounting device (2) can include a baseplate (4), a bracket (6), and a headed rod (8).

Figure 3:
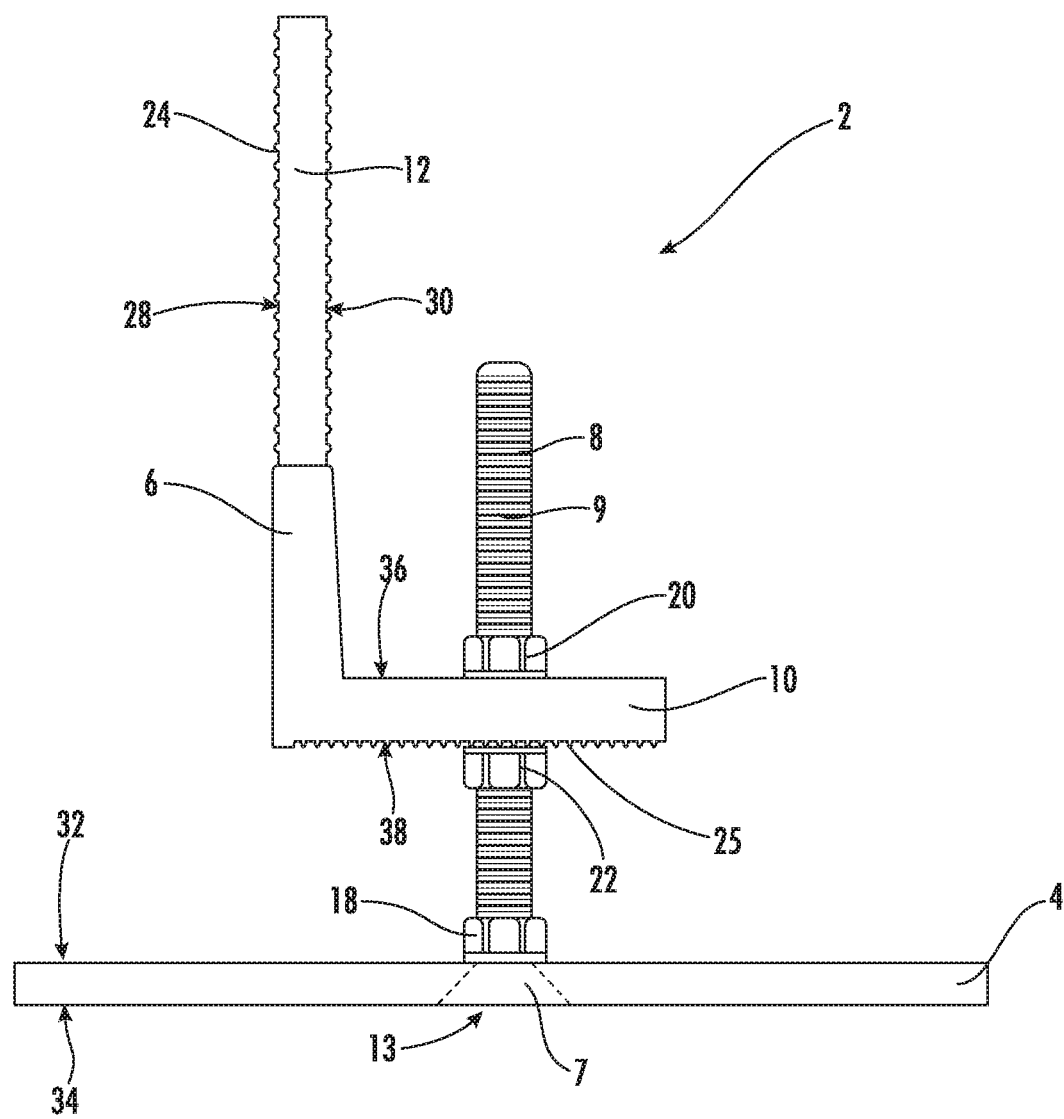
FIG. 3 is a side view of an adjustable mounting device, in accordance with some embodiments described herein.
Figure 4A:
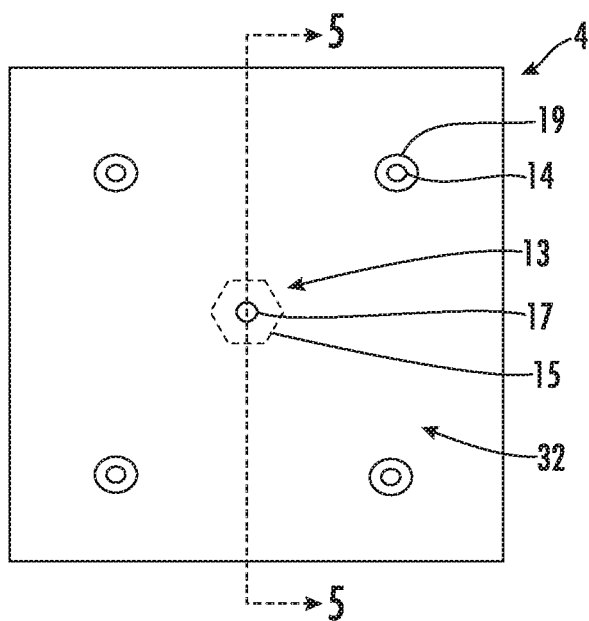
FIG. 4A is a top view of a baseplate, in accordance with some embodiments described herein.
Figure 4B:
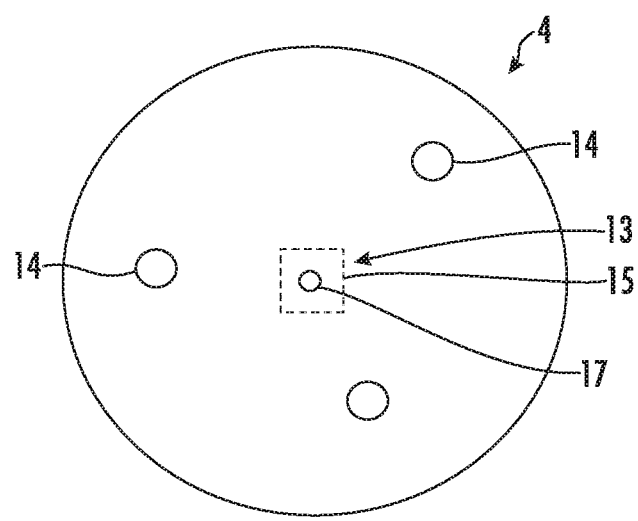
FIG. 4B is a top view of a baseplate, in accordance with some embodiments described herein.
Figure 4C:
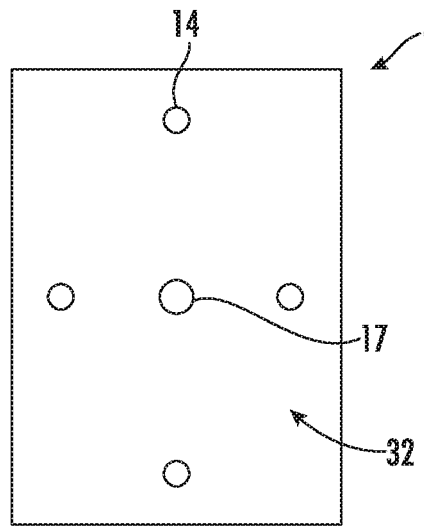
FIG. 4C is a top view of a baseplate, in accordance with some embodiments described herein.
Figure 5A:
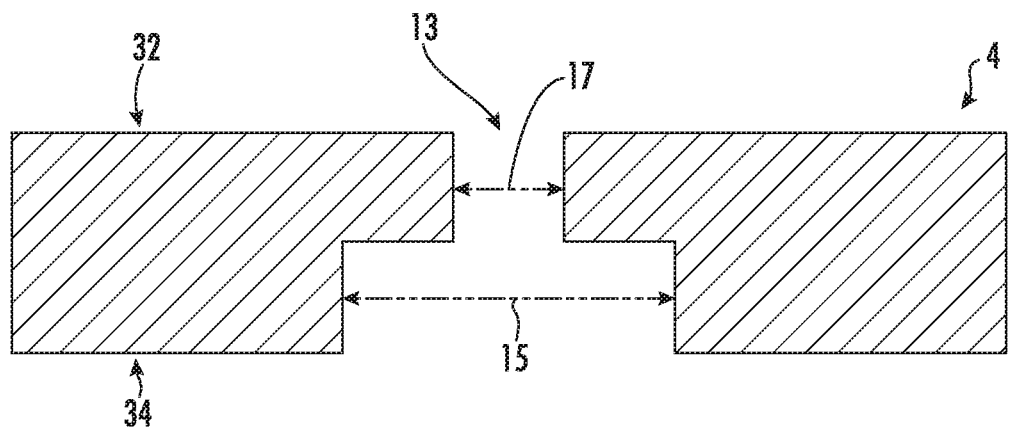
Figure 5B:
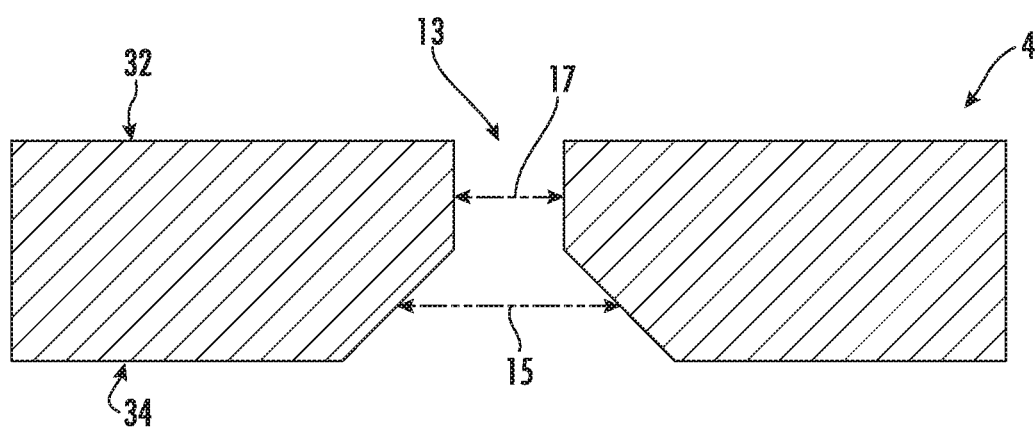
FIG. 5B is a sectional view of the fitted hole of the base plate of FIG. 3 in accordance with some embodiments described herein.

As shown in FIGS. 3, 5A, and 5B, the baseplate (4) can include a top face (32) and a bottom face (34). In some embodiments, as shown in FIGS. 4A and 4B, the baseplate (4) can include a plurality of holes, including a fitted hole (13) for retaining the head portion (7) of headed rod (8), and two or more peripheral holes (14), which are spaced apart from the fitted hole (13), for securing the baseplate (4) to a structure (e.g., a roof). In some embodiments, as shown in FIGS. 5A and 5B, the fitted hole (13) can include a recess (15), adapted to retain the head portion (7) of the headed rod (8), and a through hole (17), which allows the rod portion (9) to pass therethrough. The recess (15) can be any suitable shape for receiving the headed rod (8) when the rod portion (9) passes through the through hole (17). In some embodiments, for example, as shown in FIGS. 3 and 5B, the recess (15) can be beveled on the bottom face (34) of the baseplate in order to retain a correspondingly beveled head portion (7). In some embodiments, for example, as shown in FIGS. 5A and 5B, the recess (15) can be shaped to fit head portions (7) having different shapes, such as, for example, a square head, a hex head, a circled head, etc. In some embodiments, the peripheral holes (14) can in include a recess (19) on the top face (32) of the baseplate to retain a fastener securing the baseplate (4) to a structure. The recess (19) can have any suitable shape. In some embodiments, for example, the recess (19) can be beveled, circular, square, hex, etc. The baseplate (4) can have any suitable shape. In some embodiments, for example, the baseplate (4) is rectangular (e.g., square), circular (e.g., circle, oval), etc. See FIGS. 4A-4C.

In some embodiments, a bracket (6) is adjustably coupled to the baseplate (4). In some embodiments, the bracket (6) can include a horizontal element (10), a vertical element (12), and a plurality of holes. As shown in FIG. 3, the horizontal element (10) can include a top face (36) and a bottom face (38), and the vertical element (12) can include a proximal face (30) (i.e., facing the headed rod (8)) and an external face (28). In some embodiments, as shown in FIGS.

1-3 for example, the horizontal element and the vertical element are substantially orthogonal. In such embodiments, the bracket (6) can be L-shaped (i.e., the horizontal element (10) and vertical element (12) are perpendicular). In some embodiments, the horizontal element (10) and vertical element (12) can be prepared from a single piece of material (e.g., metal) or from a plurality of pieces that have been coupled together (e.g., welded). As shown in FIG. 1, for example, the bracket (6) is derived from a single piece of metal.

Figure 2A:
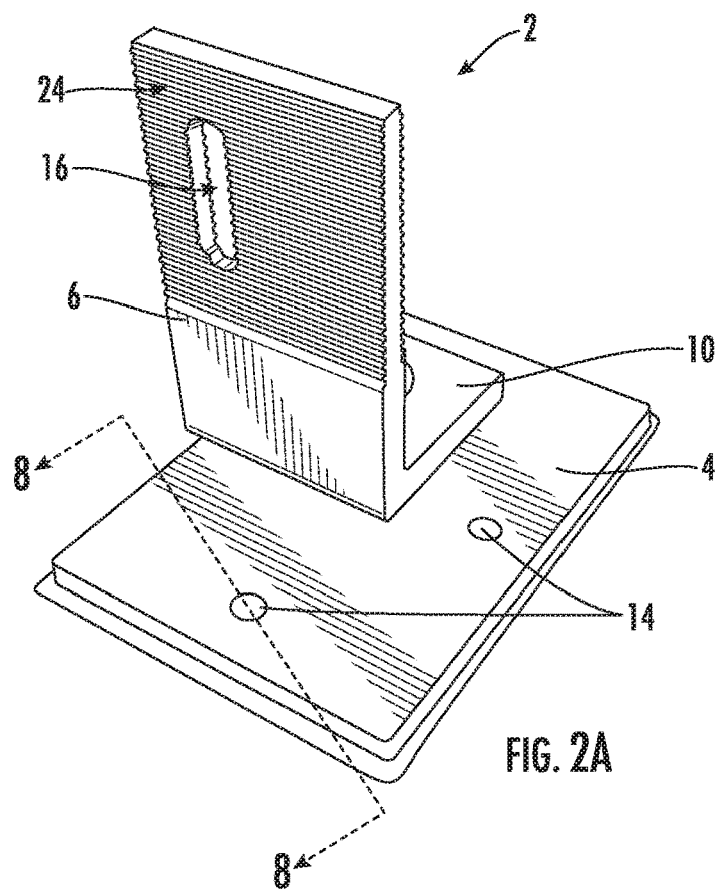
FIG. 2A is an overhead perspective view of an adjustable mounting device, in accordance with some embodiments described herein.
Figure 2B:
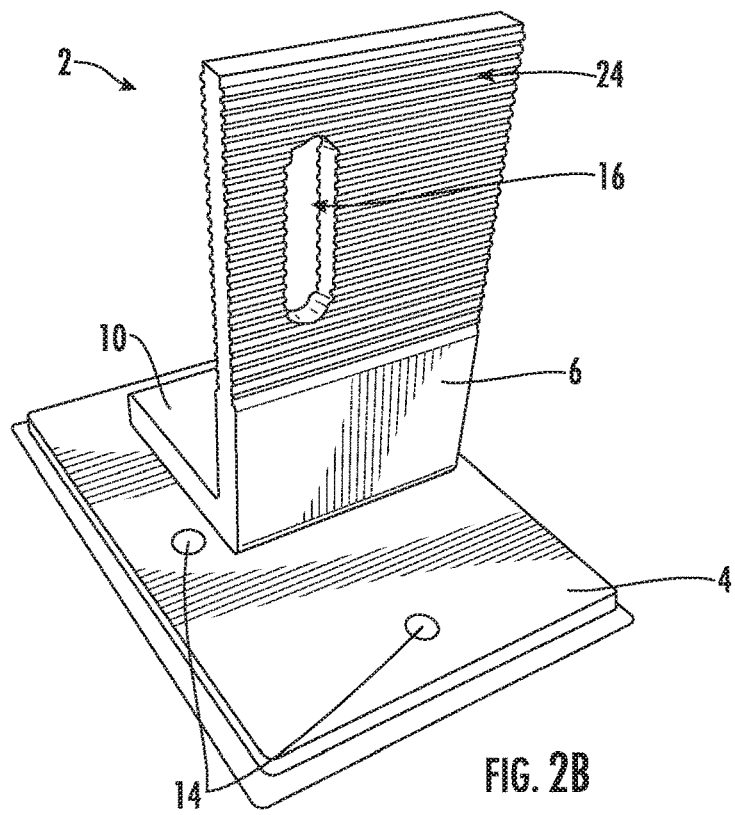
FIG. 2B is an overhead perspective view of an adjustable mounting device, in accordance with FIG. 2A.
Figure 2C:
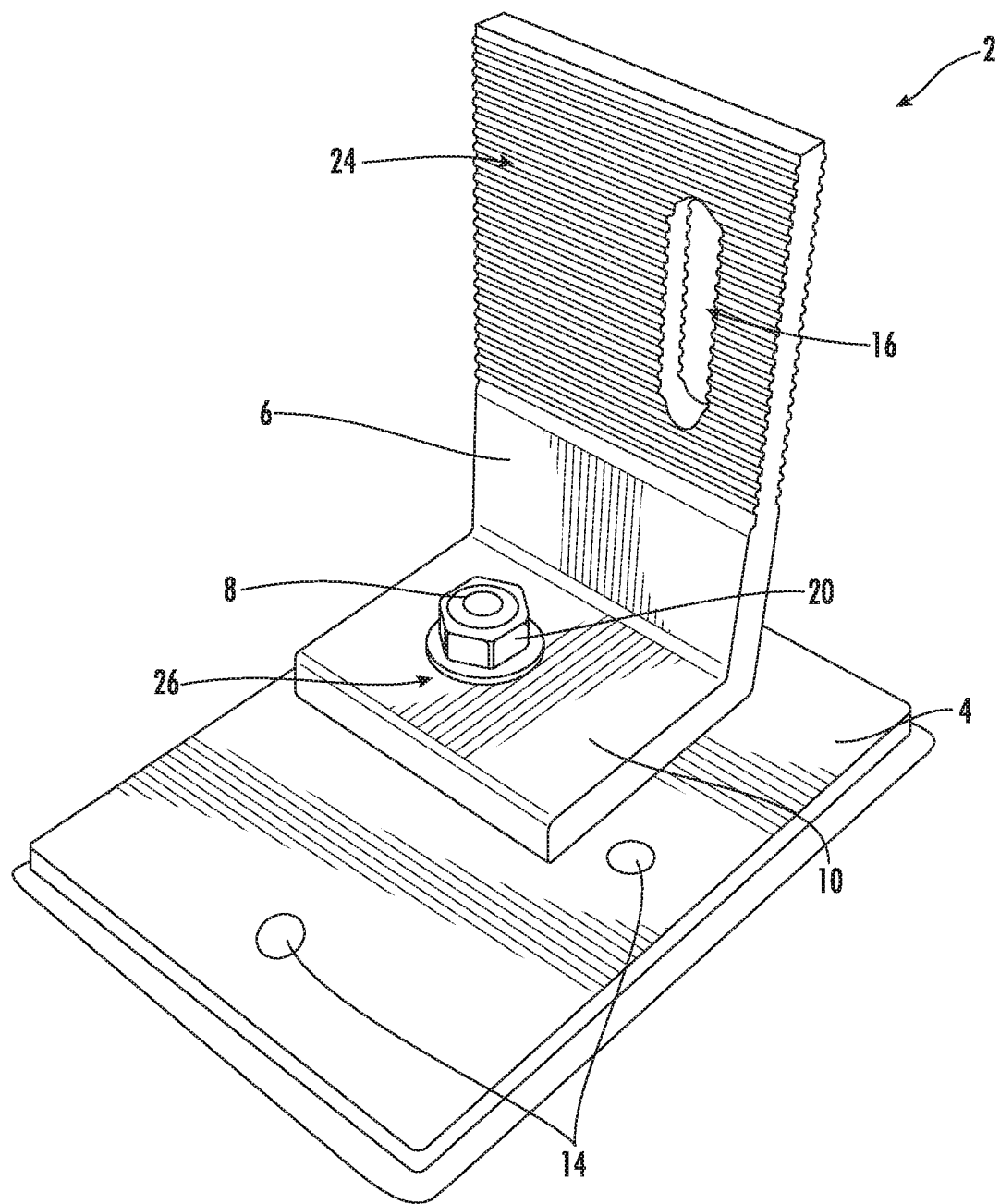
FIG. 2C is an overhead perspective view of an adjustable mounting device, in accordance with FIG. 2A.

In some embodiments, the horizontal element (10) of bracket (6) can include a first hole (26). In some embodiments, as shown in FIGS. 2C and 3, the horizontal element (10) of the bracket (6) can be configured such that a headed rod (8) can pass through the first hole (26) and be secured by a securing nut (20) (i.e., the first hole is smaller than the securing nut). The first hole (26) can be any suitable shape. In some embodiments, for example, the first hole (26) can be circular, ellipsoidal, oblong, oval, etc. For example, as partially shown in FIG. 2C, first hole (26) can be a circle. In other embodiments, the first hole (26) can be oblong to facilitate horizontally adjusting the bracket (6). In some embodiments, the first hole (26) can have an oblong shape oriented with its long sides in a direction that is traverse to the vertical element (12). In some embodiments, the first hole (26) can have an oblong shape oriented with its long sides in a direction that is lateral to the vertical element (12). In some embodiments, the top face (36) and/or bottom face (38) of horizontal element (10) can have a smooth or ridged surface. As shown in FIGS. 1 and 3, for example, the bottom face (38) of horizontal element (10) can have a plurality of ridges (25). In some embodiments, the top face (36) and/or bottom face (38) can be a partially-ridged or fully-ridged surface (lengthwise from the vertical element (12)). In either case, the ridges can extend laterally across the entire width of the first hole (26) and/or the horizontal element (10).

In some embodiments, the vertical element (12) of bracket (6) can include a second hole (16) for removably coupling a mountable object (e.g., a solar panel) with a fastener suitable for penetrating hole (16). The second hole (16) can be any suitable shape. In some embodiments, the second hole (16) can be circular, ellipsoidal, oblong, oval, etc. In some embodiments, the second hole (16) can have an oblong shape oriented with its long sides in a direction that is traverse to the horizontal element (10). In some embodiments, the second hole (16) can have an oblong shape oriented with its long sides in a direction that is vertical. For example, as shown in FIGS. 1, 2A, 2B, and 2C, second hole (16) can be oblong having vertically-oriented long sides, which provides a means for vertically adjusting an object mounted to bracket (6). In some embodiments, the proximal face (30) (i.e., facing the headed rod (8)) and/or the external face (28) of vertical element (12) can have a smooth or ridged surface. As shown in FIGS. 1 and 3, for example, the proximal face (30) and/or the external face (28) of vertical element (12) can have a plurality of ridges (24). In some embodiments, the proximal (30) and/or external faces (28) can be a partially-ridged or fully-ridged surface (lengthwise from the horizontal element (10)). In either case, the ridges can extend laterally across the entire width of the proximal face (30) and/or the external face (28). Ridges, such as the ridges (24) on vertical element (12) in FIG. 3, for example, can provide a gripping surface when an object mounted to the vertical element also includes a similarly ridged surface or is deformable (e.g., an elastic washer).

In some embodiments, the bracket (6) is adjustably coupled to the baseplate (4) with a headed rod (8). In some embodiments, as shown in FIG. 3, the headed rod (8) can include a head portion (7) and a rod portion (9). In some embodiments, the headed rod (8) projects up from the baseplate (4). In some embodiments, the head portion (7) is retained by the baseplate (4) within a recess, while the rod portion (9) passes through the fitted hole (13). In some embodiments, the recess (15) can have a larger dimension than a through hole of the fitted hole. In such embodiments, the head portion (7) can be adapted to be received within the recess (15) of the fitted hole (13) of the baseplate (4). In some embodiments, the headed rod (8) can include a screw thread beginning on its end opposite the head portion (7). In such embodiments, the rod portion (9) can be partially or fully threaded. In such embodiments, the screw thread can be configured to be rotatably, adjustably coupled to one or more nuts having a corresponding thread.

In some embodiments, as shown in FIGS. 1 and 3, an elevating nut (22), and optionally a washer, can be adjustably, rotatably coupled to the headed rod (8). In such embodiments, elevating nut (22) is between baseplate (4) and bracket (6), and adjacent to the bottom face (38) of the bracket's horizontal element (10). In some embodiments, elevating nut (22) can be adjusted to change the spaced distance between the bracket (6) and the baseplate (4).

In some embodiments, as shown in FIGS. 1, 2C, and 3, a securing nut (20), and optionally a washer, can be threaded on headed rod (8) above bracket (6) and adjacent to the top face (36) of the bracket's horizontal element (10). In such embodiments, securing nut (20) is adjustably, rotatably coupled to the rod portion (9) of headed rod (8).

During installation of an adjustable mounting device according to some embodiments, the rod portion (9) passes through the first hole (26), with the horizontal element (10) of bracket (6) sandwiched between the securing nut (20) and the elevating nut (22). By sandwiching the horizontal element, the bracket can be held rigidly in place. In some embodiments, as shown in FIGS. 1 and 3, a locking nut (18), and optionally a washer, can be threaded on the headed rod (8) between baseplate (4) and bracket (6). In such embodiments, the locking nut (18) can be forced against the top face (32) of the baseplate (4) in order to rigidly hold the headed rod in a desired orientation (e.g., vertical).

Figure 6:
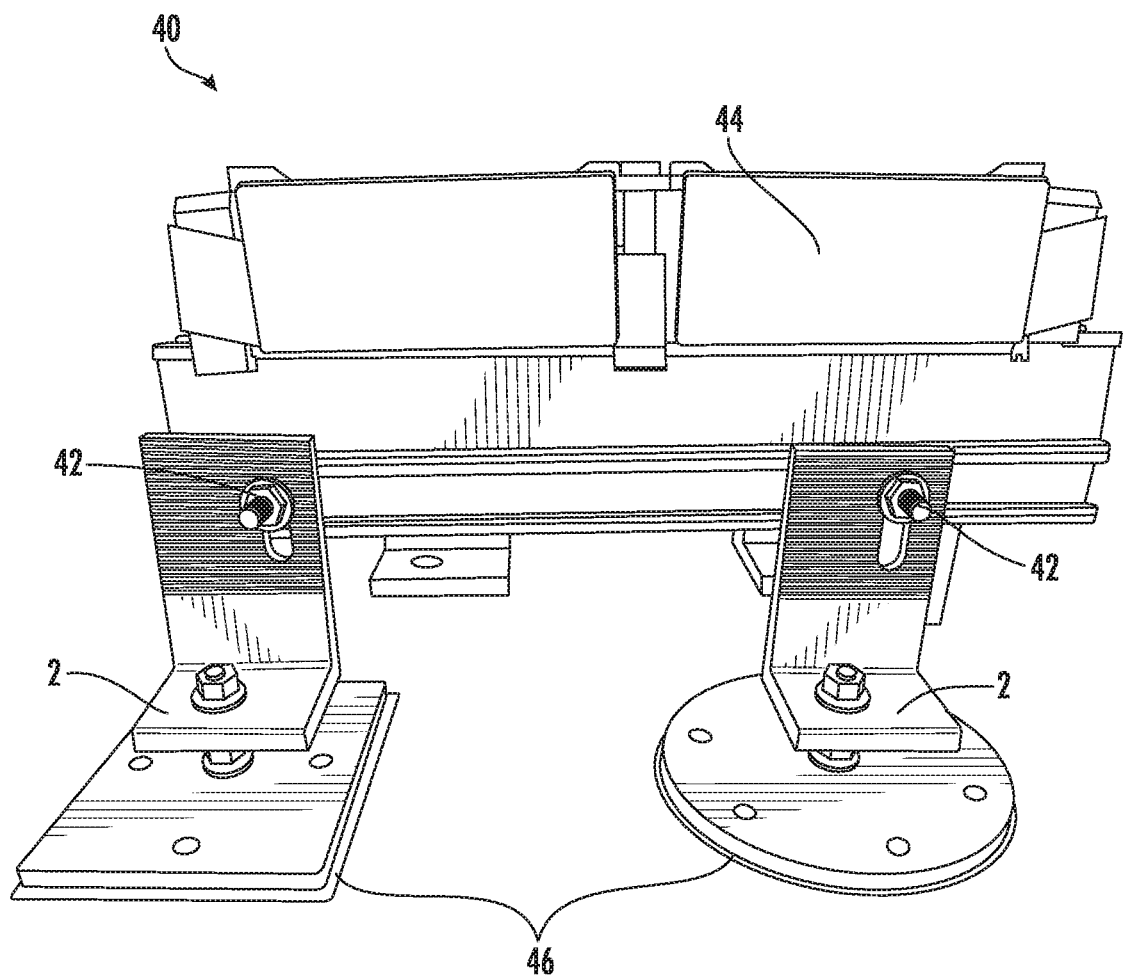
FIG. 6 is a side view of a system mounted using adjustable mounting devices in accordance with some embodiments described herein.
Figure 7:
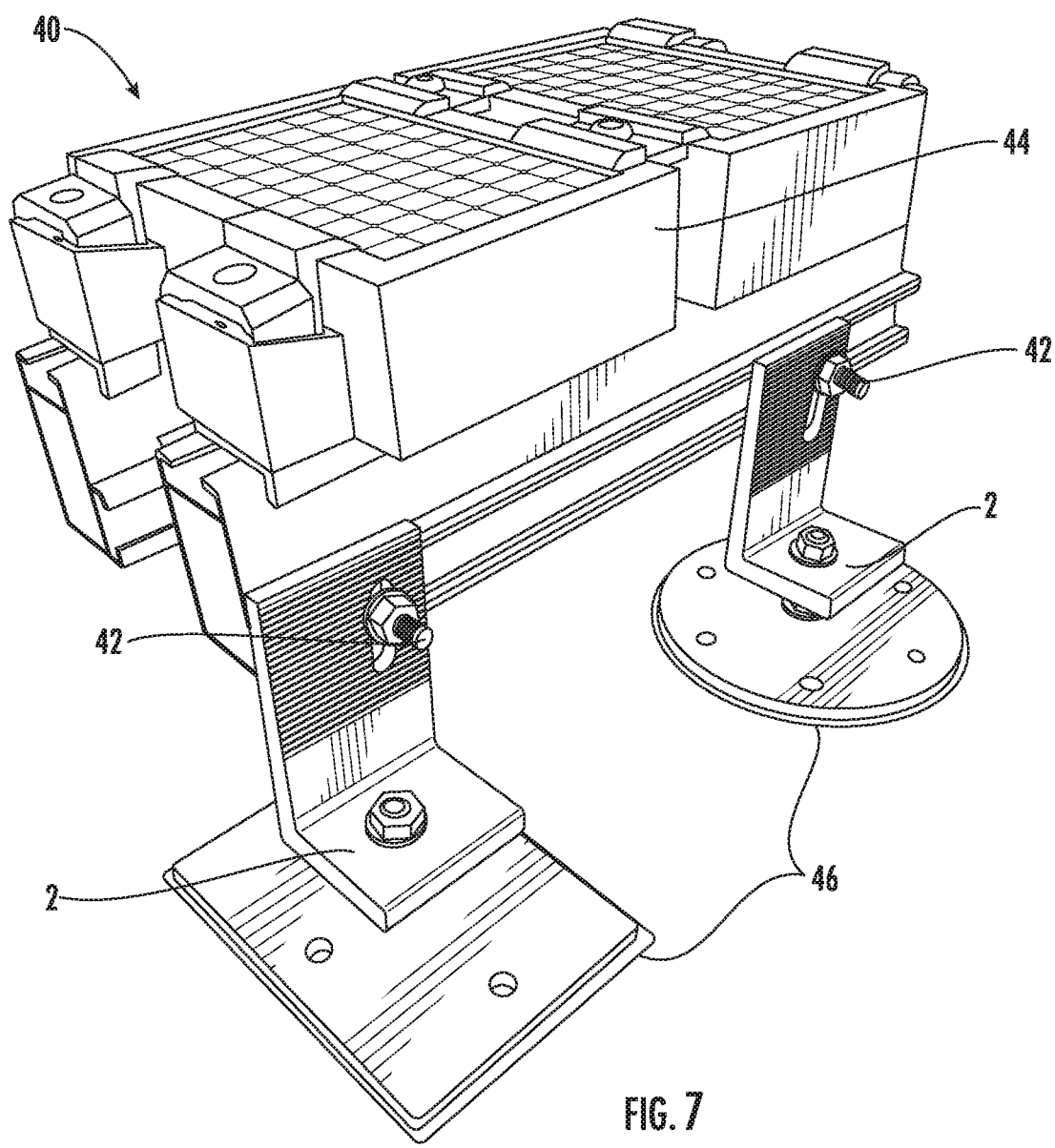
FIG. 7 is perspective view of a system mounted using adjustable mounted devices in accordance with some embodiments described herein.
Figure 8A:
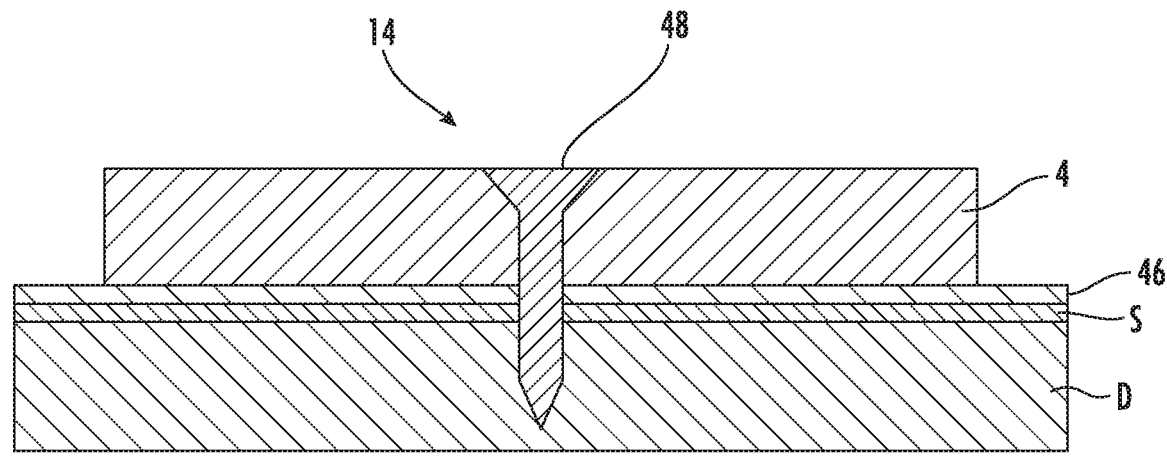
FIG. 8A is a sectional view along the 8-8 line in FIG. 2A, in accordance with some embodiments described herein.
Figure 8B:
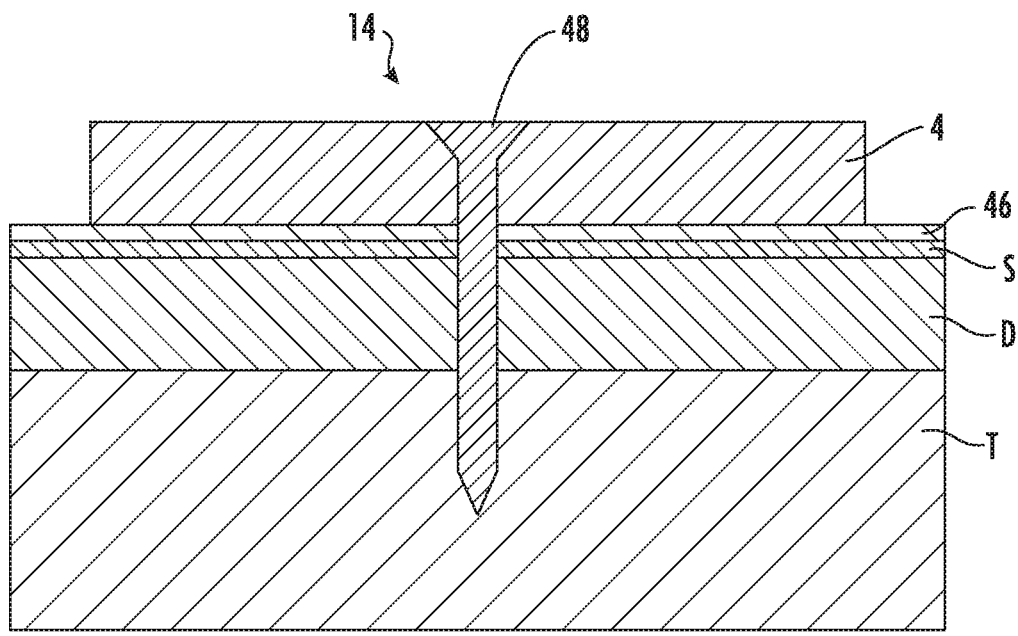
FIG. 8B is a sectional view along the 8-8 line in FIG. 2A, in accordance with some embodiments described herein.

In some embodiments, a system (40) including a plurality of adjustable mounting devices (2) is provided. In such embodiments, as shown in FIGS. 6 and 7, the system (40) can include a mountable object (44), such as a solar panel. In some embodiments, the system can include mounting hardware (42), including fasteners (e.g., bolts and nuts) and washers for coupling the mountable object to the adjustable mounting devices (2) and/or hardware and washers for securing the adjustable mounting devices (2) to a structure (e.g., a roof). The system (40) can further include any additional suitable hardware. In some embodiments, the system can include one or more barrier layers (46) (e.g., butyl rubber sheet) that can be installed between the baseplate (4) of the adjustable mounting device (2) and the surface in which the system (40) is to be mounted. In such embodiments, the barrier layer (46) can be airtight, waterproof, weather resistant, UV resistant, chemical resistant, tear resistant, heat resistant, and/or electrically insulating. The barrier layer (46) can have any suitable thickness and/or density.

The adjustable mounting device and system in accordance with some embodiments described herein can be utilized to secure mountable objects to a surface. For example, in some embodiments, the adjustable mounting device and system can be used to mount solar panels to the roof of a structure using a plurality of brackets that are secured to oriented strand board (OSB), plywood, or other sheathing materials, or directly to trusses under the roof deck. In some embodiments, the baseplate (4) of adjustable mounting bracket (2) can be mounted to a truss (T). For example, as shown in the sectional view in FIG. 8B, the baseplate (4) is secured with the fastener (48) to the truss (T) lying underneath the deck (D), which lies underneath the shingle (S) and barrier layer (46) shown in FIG. 2A. In some embodiments, the baseplate (4) of the adjustable mounting device (2) can be mounted to a roof or deck surface without also being fastened to a truss. For example, as shown in the sectional view in FIG. 8A, the baseplate (4) is secured with the fastener (48) to the deck (D), which lies underneath the shingle (S) and barrier layer (46) shown in FIG. 2A. Any suitable fastener (e.g., screw, nail, bolt, etc.) and optionally a washer (e.g., rubber sealing washer) can be used to secure baseplate (4) to a truss or a deck (D). In some embodiments, a zinc alloy galvanized, metal-to-wood fastener can be used. In some embodiments, the fastener can be self-drilling, include a hex-washer head, and/or include an ethylene propylene diene monomer rubber sealing washer attached thereto or integrated thereon. Because the peripheral holes (14) of the baseplate (4) are spaced apart from the fitted hole (13), the baseplate (4) can be advantageously secured to any area of a roof without having to carefully locate the roof trusses and their spacing. This greatly expedited installation of the solar panel or other object being secured to the roof.

In some circumstances, a surface may not be flat, or a panel may need to be mounted at a pitch (angle). If a mounting bracket is too rigid, different sized mounted brackets and/or brackets with different angles may be needed. The embodiments described herein provide an adjustable mounting device and system that allows an installer to use a system with a plurality of identical mounting devices, each of which are independently adjustable. The headed rod (8) and the bracket (6) provide a solar panel installer with multiple ways to adjust a panel. For example, the adjustable mounting device can include a headed rod (8) having an elevating nut (22) that is rotatably, adjustably coupled to the threaded rod portion (9), and a securing nut (20) that is rotatably, adjustably coupled to the threaded rod portion (9), whereby the elevating nut (22) and securing nut (20) can be simultaneously adjusted to secure the horizontal element (10) of bracket (6). The elevating nut (22) and the securing nut (20) can be adjusted vertically along a threaded rod portion (9) of the headed rod (8). This mechanism provides a convenient means of adjusting the spaced distance between the bracket and the baseplate (4) and roof; and, therefore, a means for adjusting the height of the mounted object relative to the baseplate (4) and roof at that specific location.

In addition, the vertical element (12) of bracket (6) can include an oblong second hole (16) adapted for coupling a mountable object to the bracket with a fastener. Because the second hole (16) can have an oblong shape oriented with its long sides in a direction that is traverse to the horizontal element (10), a fastener penetrating the second hole (16) can be adjusted so that the mounted object can be vertically adjusted at that specific position. When a solar panel is secured to a roof with a plurality of mounting brackets, this mechanism provides a convenient method for adjusting the height of the mountable object at each bracket.

Furthermore, the horizontal element (10) of the bracket (6) can include a first hole (26) through which the headed rod (8) passes. In some embodiments, the first hole can be an oblong first hole (26) oriented to extend longitudinally away from the vertical element (12), which will provide a way to horizontally adjust a mounted object after the baseplate has been secured to the structure.

The system in accordance with some embodiments described herein provides a convenient and streamlined method for installing mountable objects, such as solar panels, because it can include adjustable mounting devices having a baseplate that does not need to be secured to a roof beam, and the plurality of devices needed to secure a solar panel to a roof can be individually adjusted in both vertical and horizontal directions with respect to the roof.

Although the subject matter has been described in terms of exemplary embodiments, it is not limited thereto. Rather, the appended claims should be construed broadly, to include other variants and embodiments, which may be made by those skilled in the art.

What is claimed is:

1. An adjustable mounting device, comprising:
   a baseplate comprising a top face, a bottom face, a plurality of holes, a through hole, and a recess having a larger dimension than the through hole, the recess formed in the bottom face;
   a bracket comprising a horizontal element, a vertical element, and a plurality of holes;
   a headed rod having a head portion coupled to the baseplate by being received within the recess in the bottom face such that the head portion is flush with the bottom face, a rod portion coupled to the bracket, and a screw thread;
   an elevating nut threaded on the screw thread of the headed rod; and
   a locking nut threaded on the screw thread of the headed rod;
   wherein the baseplate comprises a fitted hole for retaining the head portion between the top and bottom faces of the baseplate;
   wherein the headed rod is configured to provide an adjustable spaced distance between the baseplate and bracket,
   wherein the elevating nut is threaded onto the headed rod between the baseplate and the bracket, and forced against a bottom face of the bracket's horizontal element,
   wherein the locking nut is threaded onto the headed rod between the baseplate and bracket and forced against the top face of the baseplate in order to rigidly hold the headed rod in a desired orientation with respect to the baseplate, and
   wherein the headed rod comprises a free portion between the locking nut and the elevating nut, and wherein adjustment to the elevating nut results in a change to the adjustable spaced distance between the baseplate and the bracket.

2. The adjustable mounting device of claim 1, wherein the plurality of holes in the baseplate includes two or more peripheral holes, spaced apart from the fitted hole, for securing the baseplate to a structure.

3. The adjustable mounting device of claim 2, wherein the bracket comprises a first hole in its horizontal element for receiving the rod portion of the headed rod.

4. The adjustable mounting device of claim 3, wherein the hole on the horizontal element has an oblong circle shape.

5. The adjustable mounting device of claim 2, wherein the two or more peripheral holes include at least three holes.

6. The adjustable mounting device of claim 2, wherein the two or more peripheral holes include at least two pairs of two holes, each of which being arranged to form a line with the fixed hole.

7. The adjustable mounting device of claim 6, wherein the lines formed with the fixed hole are perpendicular to one another.

8. The adjustable mounting device of claim 1, wherein the bracket comprises a second hole in its vertical element for removably coupling a mountable object.

9. The adjustable mounting device of claim 8, wherein the mountable object is a solar panel.

10. The adjustable mounting device of claim 8, wherein the hole on the vertical element has an oblong circle shape.

11. The adjustable mounting device of claim 1, further comprising a securing nut for receiving the headed rod, wherein the securing nut is above the bracket and adjacent to a top face of the bracket.

12. The adjustable mounting device of claim 1, wherein the bracket comprises ridges on one or both faces of the vertical element, the horizontal element, or both elements.

13. The adjustable mounting device of claim 12, further comprising a deformable washer pressed into the ridges on one or both faces of the vertical element.

14. The adjustable mounting device of claim 1, wherein the headed rod further extends through the first hole on the horizontal element.

15. The adjustable mounting device of claim 1, wherein the horizontal element and the vertical element are orthogonal.

16. The adjustable mounting device of claim 1, wherein the bracket comprises a single piece of metal.

17. A system comprising a plurality of adjustable mounting devices according to claim 1.

* * * * *